Feb. 11, 1936.   C. B. HATHAWAY   2,030,108
GENERATOR
Filed April 14, 1934
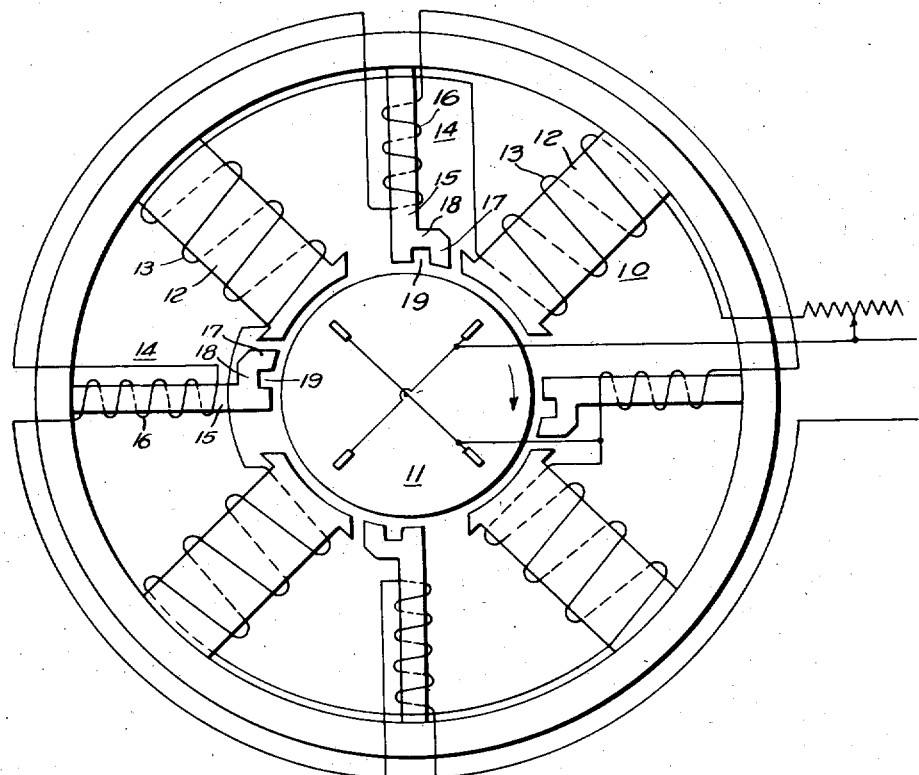
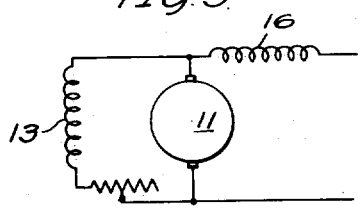
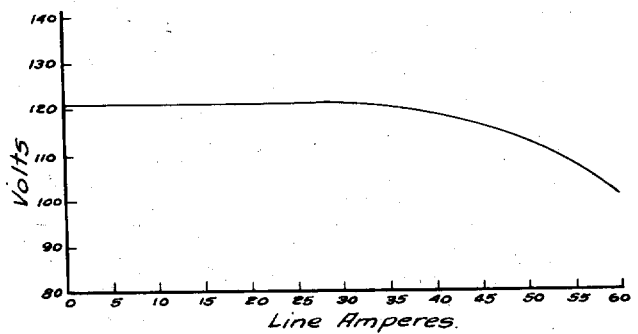
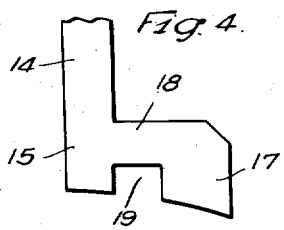
WITNESSES:
INVENTOR
Clarence B. Hathaway
BY
ATTORNEY Patented Feb. 11, 1936

2,030,108

UNITED STATES PATENT OFFICE 2,030,108

GENERATOR

Clarence B. Hathaway, Wilkinsburg, Pa., assignor to Westinghouse Electric & Manufacturing Company, East Pittsburgh, Pa., a corporation of Pennsylvania Application April 14, 1934, Serial No. 720,605

5 Claims. (Cl. 171—223)

The invention relates generally to generators and more particularly to flat voltage shunt generators.

The object of the invention is to provide for maintaining a substantially constant voltage from no load to full load.

It is also an object of the invention to provide for decreasing the voltage after it reaches full load to avoid the overloading of the generator.

Other objects of the invention will in part be obvious and in part appear hereinafter.

The invention accordingly is disclosed in the accompanying drawing and comprises the features of construction, combination of elements and arrangement of parts which will be exemplified in the structure hereinafter set forth and the scope of the application of which will be indicated in the claims.

For a fuller understanding of the object of the invention, reference may be had to the following detailed description taken in connection with the accompanying drawing, in which Figure 1 is a diagrammatic view of a generator constructed in accordance with this invention, Fig. 2 is a characteristic load curve plotted from readings taken from a generator constructed in accordance with this invention.

Fig. 3 is a diagrammatic view of the circuit connections for the generator,

Fig. 4 is a view in side elevation of commutating and auxiliary pole structures.

Referring now to the drawing, the shunt generator illustrated comprises a plurality of field poles 10 for producing a magnetic field, and a rotor 11 disposed to rotate in the magnetic field to generate a voltage.

Each field pole 10 comprises a core 12 and a shunt field winding 13. As illustrated, the laterally extending tips of the field poles are made short in order to minimize the effect of flux distortion as a result of armature reaction and to increase the space between the poles to accommodate auxiliary equipment. Since this is standard practice in the construction of certain types of generators, a detailed description of how the effect of the flux distortion caused by armature reaction is minimized by employing short pole tips is considered unnecessary.

A plurality of commutating poles 14 are provided to improve commutation. As illustrated, the commutating poles each comprise a core 15 and a series field winding 16. The commutating poles are disposed centrally between the field poles.

In the operation of generators provided with field and commutating poles only, a constant voltage cannot be generated because of the voltage drop in the machine which increases with an increase in the current delivered. The decrease in voltage resulting from an increase in current is generally known as the IR drop in the machine.

In the present structure in order to compensate for the IR drop in the machine, auxiliary poles 17 are provided. As illustrated, the auxiliary poles 17 are carried by the commutating poles 14 and disposed in advance of the corresponding field poles progressing clockwise of the generator as viewed in Fig. 1.

In this embodiment of the invention, the auxiliary poles 17 are made integral with the commutating poles. As illustrated, the poles 17 are spaced from the commutating poles a predetermined distance. Extending between the commutating poles 14 and the auxiliary poles 17 are necks 18 through which the flux passes. By making the necks 18 of a predetermined cross-sectional area the amount of flux passing from a commutating pole 14 to an auxiliary pole 17 may be limited.

In designing the auxiliary pole, the neck will be made of a cross-sectional area which will permit the flux in auxiliary pole 17 to continuously increase from no load to full load to compensate for the IR drop in the machine. When the load imposed on the generator has reached substantially full load, the neck 18 will be saturated with magnetic flux and there will be substantially no further increase in the flux in the auxiliary pole 17. Therefore, when the load exceeds the full load rating of the generator, the voltage will continuously decrease as load increases because of the IR drop in the machine. As a result, the generator will not be subjected to excessive overloads.

The providing of a space between a commutating pole 14 and an auxiliary pole 17 as shown at 19 has the advantage of not decreasing the effectiveness of the commutating poles and yet providing means for compensating for the IR drop in the machine from no load to full load. This gives the desired substantially constant voltage from no load to full load.

In the operation of the machine as a generator the shunt and series field windings 13 and 16, respectively are energized causing lines of flux to pass through the main and auxiliary poles 10 and 17 respectively, providing a magnetic field in which the armature 11 is rotated. The lines of flux passing through each main field pole 10 and the corresponding auxiliary pole are in the same direction.

If the machine is operated as a motor, current will flow in the opposite direction in a series field winding 16. Therefore, the flux passing through the auxiliary field poles 17 will tend to weaken the flux passing through the corresponding main field poles 10.

Referring to Figure 2, the curve illustrates how the voltage is maintained substantially constant from no load to full load. A full load current value of the generator is about 37 amperes and at this current load, the voltage is substantially 118 which is only a drop of two volts from the full load voltage.

In conclusion, it is pointed out that while the illustrated example constitutes a practical embodiment of my invention, I do not limit myself to the exact details shown since modifications of the same may be considerably varied without departing from the spirit of the invention as defined in the appended claims.

I claim as my invention:

1. In a generator in combination, a plurality of field poles for producing a magnetic field flux, commutating poles disposed between the field poles, an auxiliary pole disposed between the commutating poles and the field poles, means for conducting magnetic flux associated with the commutating and auxiliary poles to cooperate in building up the field flux, the auxiliary pole receiving the flux it delivers from the commutating pole and the means for conducting the magnetic flux serving to limit the flux delivered through the auxiliary pole.

2. In a generator in combination, a field pole structure for producing a magnetic field flux, commutating poles disposed centrally between the field poles, an auxiliary pole carried by a commutating pole, the auxiliary pole being spaced from the commutating pole, and a flux path disposed between the auxiliary pole and the commutating pole, the flux path being disposed to limit the flux that flows between the commutating pole and the auxiliary pole.

3. In a generator in combination, a field pole structure for producing a magnetic field flux, a rotor disposed to rotate in the field flux, commutating poles disposed between the field poles to affect the commutation, auxiliary poles carried by the commutating poles, the auxiliary poles being spaced from the commutating poles and located between them and the next adjacent field pole disposed in the direction of rotation of the rotor, and a magnetic path between the auxiliary pole and commutating pole, said magnetic path being disposed to limit the flow of flux from the commutating pole to the auxiliary pole.

4. In a generator in combination, a plurality of field poles for producing a field flux, a rotor disposed to rotate in the field flux, a plurality of commutating poles disposed between the field poles to improve the commutation, auxiliary poles carried by the commutating poles, the auxiliary poles being disposed a predetermined distance in advance of the commutating poles, and means for delivering flux from the commutating poles to the auxiliary poles, said means being disposed to limit the amount of flux delivered from the commutating poles to the auxiliary pole.

5. In a generator in combination, a plurality of field poles for producing a field flux, a rotor disposed to rotate in the field flux to generate a voltage, a commutating pole disposed between adjacent field poles, an auxiliary pole formed integral with the commutating pole and disposed in advance thereof, the auxiliary pole being formed integral with the commutating pole to provide for the delivery of flux from the commutating pole, provision being made in the forming of the commutating pole and auxiliary pole to limit the amount of flux delivered.

CLARENCE B. HATHAWAY.